US006702337B2

(12) United States Patent
Rutter et al.

(10) Patent No.: US 6,702,337 B2
(45) Date of Patent: Mar. 9, 2004

(54) SPOUT FOR SCREW ON CONNECTOR

(75) Inventors: Christopher C. Rutter, Oakland, CA (US); Lamar Spalding, Hayward, CA (US)

(73) Assignee: David S. Smith Packaging Ltd. (GB)

( * ) Notice: Subject to any disclaimer, the term of this patent is extended or adjusted under 35 U.S.C. 154(b) by 0 days.

(21) Appl. No.: 10/083,084

(22) Filed: Feb. 26, 2002

(65) Prior Publication Data
US 2002/0079704 A1 Jun. 27, 2002

Related U.S. Application Data

(62) Division of application No. 09/547,465, filed on Apr. 12, 2000.

(51) Int. Cl.[7] .............................................. F16L 19/00
(52) U.S. Cl. ....................... 285/377; 285/376; 285/362; 285/401
(58) Field of Search ................................ 285/376, 360, 285/401, 402, 361, 362, 377, 398; 141/346; 222/569, 519, 522

(56) References Cited

U.S. PATENT DOCUMENTS

| 807,417 A | * | 12/1905 | Caskey ..................... 285/377 |
| 1,097,508 A | * | 5/1914 | Bailey ...................... 285/39 |
| 1,968,075 A | * | 7/1934 | Ewald ...................... 251/149.5 |
| 2,286,263 A | | 6/1942 | Comins |
| 2,823,699 A | * | 2/1958 | Willis ..................... 137/625.26 |
| 2,972,491 A | * | 2/1961 | Dutton ..................... 251/89.5 |
| 3,405,831 A | | 10/1968 | Hudson |
| 3,459,446 A | * | 8/1969 | Walsh ...................... 285/362 |
| 4,421,146 A | | 12/1983 | Bond et al. |
| 4,445,539 A | | 5/1984 | Credle |
| 4,445,551 A | | 5/1984 | Bond et al. |
| 4,564,132 A | | 1/1986 | Lloyd-Davies |
| 5,095,962 A | | 3/1992 | Lloyd-Davies et al. |
| 5,425,479 A | | 6/1995 | Credle, Jr. |
| 5,467,806 A | | 11/1995 | Stricklin et al. |
| 5,477,883 A | | 12/1995 | Totten |
| 5,697,410 A | | 12/1997 | Rutter et al. |
| 5,983,964 A | | 11/1999 | Zielinksi et al. |
| 6,170,543 B1 | * | 1/2001 | Simmel et al. ............. 141/346 |
| 6,481,763 B2 | * | 11/2002 | Mintz et al. ................ 285/360 |

FOREIGN PATENT DOCUMENTS

GB 239771 A 2/2000

OTHER PUBLICATIONS

Photographs of the line connector and spout assembly manufactured by ITW New Zealand Corporation Part No. 390–0267.

* cited by examiner

Primary Examiner—David Bochna
(74) Attorney, Agent, or Firm—Bell, Boyd & Lloyd LLC; Joseph A. Fuchs; Michael S. Leonard

(57) ABSTRACT

A spout for a flexible bag adapted to hold a liquid, the spout adapted for coupling with a connector having a rotatable spout adapter with an internal thread. The spout has a substantially cylindrical body with an outer surface, a spout opening, and a spout axis. The spout further has at least one flexible tab attached to and protruding radially distal from the outer surface of the cylindrical body of the spout. The tab has a top side that is substantially perpendicular to the spout axis, a bottom side opposing the top side, and a leading edge for engaging the thread. Additionally, the spout, has an undeformed tab length that typically deforms upon engaging the internal thread of the spout adapter.

48 Claims, 5 Drawing Sheets

SPOUT FOR SCREW ON CONNECTOR

CROSS-REFERENCE TO RELATED APPLICATIONS

This application is a divisional of U.S. patent application Ser. No. 09/547,465, filed on Apr. 12, 2000, upon which a claim of priority is based. The U.S. patent application Ser. No. 09/547,465 application is hereby incorporated herein by reference, and made a part hereof.

TECHNICAL FIELD

The present invention generally relates to a spout for quick connect and disconnect with a connector, and more specifically to a spout having flexible tabs for threading, where the tabs provide for both axial stability during threading and self-locking action to keep the spout and connector coupled.

BACKGROUND OF THE INVENTION

Line coupling devices are commonly used in fluid-containing apparatus to allow for connecting or disconnecting lines with a minimum of fluid loss, usually at locations where fluids are introduced or extracted, or at locations that facilitate maintenance or other operations. As used here, the term fluid includes liquids, solid particles, and gases under pressure or vacuum, or combinations of these fluids. Providing for connecting or disconnecting of lines can be especially difficult with fluid-containing lines. Coupling of the lines while controlling fluid loss is usually achieved by incorporating coupling-actuated valves in one or more line ends or into a connector. Coupling actuates the valves, allowing fluid to flow through the connected lines, while uncoupling the lines seals one or both lines. Coupling-actuated valves of this design are applicable to a great variety of commercial, industrial, and consumer goods.

Of particular interest here are line connectors for use in the beverage industry where beverages and beverage syrups are packaged in a collapsible bag housed in a box, commonly referred to as a disposable bag-in-box package. An external line is attached to the bag-in-box package through a line connector that is configured for quick coupling to a bag through a spout. Leakage from the line and bag prior to coupling is minimized by line connector and spout valves that are configured to open when the line connector and spout are brought together, allowing fluid to pass through the connector. Engaging these connectors entails actions that both provide a leak-proof seal and open a valve to control fluid flow. In the case of beverage supplies in the service sector of the economy, where timely response to customer's desire is paramount, bag-in-boxes are often stored in areas that are not readily or easily accessible as under or above a service counter and in dimly lighted environments. Thus it is important that the connectors can also be easily worked by the operator with a minimum of motion and force, and with a minimum of movement of the connectors and other equipment. In addition, the spout portion of the connector is often incorporated into a disposable bag, and thus it is necessary that the spout and the valve mechanism internal to the spout be inexpensive.

The patents and publications discussed in this Background of the Invention provide background for the invention or are related to the invention. All publications and patents discussed herein are hereby incorporated by reference in their entireties for all purposes.

In the U.S. Pat. No. 4,445,551 to Bond et al., entitled Quick-Disconnect Coupling and Valve Assembly, a connector is disclosed that slides into a slidable valve contained within a spout. The slidable valve has fingers that fit into the connector, so that sliding the connector into the spout causes the slidable valve to grip the connector and slide into a position in the spout where the slidable valve is opened. The alignment of the connector with the slider valve is crucial to the operation of this invention, and may be problematic with this configuration.

The U.S. Pat. No. 4,421,146, also to Bond et al., entitled Quick-Disconnect Service-Line Connector and Valve Assembly, addresses some of the potential problems of the '551 patent. The '146 patent discloses a connector that has a lower U-shaped flange portion for coupling with the spout and an upper body portion for slidably housing the valve assembly, which is slidable toward the lower U-shaped flange portion and into the spout. The connector is coupled to the spout by positioning the connector adjacent the spout and then laterally shifting or positioning the connector so that the U-shaped flange is saddled about an outer surface of the spout. However, use of this connector requires the operator to accurately position the various components during coupling and uncoupling, and thus requires the use of both hands by the operator.

U.S. Pat. No. 4,564,132 to Lloyd-Davies, en titled Fluid Dispensing Assembly, discloses a connector valve that has a nut rotatably connected to it, the mating and valve actuating occurring when the spout and nut threads are engaged. The incorporation of threaded spouts presents a potential problem in achieving compatibility between different bag-in-box connector systems. The use of a complete thread form also can require multiple turns for making a connection and involves using a longer spout. These may be disadvantages for systems located in small spaces since more room is required to operate the spout, and since it may also be difficult to load or remove the boxes in small spaces.

U.S. Pat. No. 5,983,964 to Zielinksi et al., entitled Method and Apparatus for Coupling with a Spout, discloses a valve subassembly for connecting to a line and a mating spout that contains a mechanism for actuating the valve subassembly. In that patent, the valve subassembly is described for use in conjunction with an axially engaged connector and was designed for compatibility with existing bag-in-box connectors.

The ITW New Zealand Corporation produces a screw on connector comprising a line connector and spout assembly (part number 390-0267) that incorporates partial threads on the spout for connecting with a threaded line connector. The ITW connector incorporates two rigid partial threads on the spout for mating with a threaded line connector, thus allowing for some amount of compatibility. The ITW connector further has a self-locking feature that incorporates a notch on the spout and a mating piece on the line connector that fits into the notch to form a detent. As with the Lloyd-Davies connector, placing a rigid thread on the spout provides compatibility with other connectors difficult.

Providing an inexpensive and easily manufactured line connector and spout combination that performs quickly, easily and positively with a minimum of motion is an important feature for bag-in-box connectors. In addition, it is important that the line connector and spout be easy and inexpensive to manufacture, and that the spout can inexpensively be incorporated into a disposable bag.

What is needed is a method and apparatus that will allow for quick coupling and decoupling of fluid-containing lines. It is preferred that this is accomplished with a minimum of rotational or lateral motion of the lines, that the coupling incorporate means for sealing off the lines when decoupled and opening the lines when coupled, and that the connector provides a positive indication to the operator that a coupling has occurred and locks the connectors to prevent decoupling. In addition, due to the large number of line connectors and spouts in the field, there also exists a need to have compatibility between new spouts and existing line connectors. To ensure compatibility between new and currently used connector designs, there is a need for bag-in-box spouts to conform to certain external dimensions and shapes. Current spout designs have a series of flanges extending radially outwards from the spout, making it difficult to incorporate threaded connectors with many current spout designs.

SUMMARY OF THE INVENTION

The present invention is directed to a spout for coupling fluid-containing lines that may overcome potential problems in the prior art. The introduction of new coupling technologies is accelerated by apparatus compatible with the large base of existing equipment. Thus there is also a need for new spouts to be compatible with other, widely used line connectors. The apparatus of the present invention is comprised of a spout that can be paired with a line connector, where the combination has cooperating threaded features to provide a positive, self-locking action when the pair are coupled. The spout is fitted with one or more, but preferably two, tabs that can be threadably engaged by a nut, preferably on the line connector. The tabs extend radially outwards from a tab flange, that itself extends radial outwards from the spout. The tab flange and other flanges on the spout are provided so that the spout of the present invention is compatible with existing line connectors. The mating line connector is fitted with a nut having an internal flange that fits into a recess in the connector, allowing for the line connector to threadably engage the spout by rotating only the nut. Specifically, in addition to the spout and line connector being capable of working together, the spout of the present invention will also work with some of the more common prior art line connectors.

Stability during threading is achieved in several embodiments by the force that flexed tabs impart onto the threads of the line connector. If the connector is not axially aligned, then the several tabs will not respond equally to the misalignment, and the resulting forces will tend to straighten the connector and stabilize the threading action. When threaded, the spout and connector provides resistance to valves that may be internal to the connector. Specifically, concentric with and internal to the line connector and spout are one or more spring-loaded poppet valves that open when the line connector is coupled to the spout. Actuating the valve produces an axial force on the tab that acts to uncouple the connector. There is also a tab restraining portion of the threads that provides the operator with positive identification that the connector is fully coupled and that the connector will not unthread to the extent that valves that are internal to the connector close. In one embodiment, the tab restraining portion includes a detent formed by thread and tab that is held in place by the action of the axial force. In another embodiment, the threads taper near the tab restraining portion and the tabs are deformably forced into place. In yet another embodiment, the axial force deforms the tabs within the threads increasing the contact area between tab and thread, and thus the frictional force for threading.

In view of the discussion above, there exists a demonstrated need for an advancement in the spout coupling art. According to one aspect of the present invention, a novel method and apparatus for coupling with a spout that may overcome certain problems in the prior art is provided.

According to another aspect of the present invention, a novel method and apparatus that can quickly couple and decouple fluid-containing lines in a single-handed operation is provided.

According to another aspect of the present invention, a novel method and apparatus that can quickly couple and decouple fluid-containing lines that is compatible with existing, nonthreaded connectors is provided.

According to another aspect of the present invention, a novel method and apparatus for coupling of cylindrical shaped bodies with a quick screw-on connector that is self-locking and that may evidence a positive indication of coupling is provided.

According to another aspect of the present invention, a novel method and apparatus for a combination of line connector and spout, where the spout is compatible with existing line connectors is provided.

According to another aspect of the present invention, a spout and line connector combination with a positive, self-locking stop by the cooperation of deformable tabs on the spout with line connector thread is provided.

According to another aspect of the present invention, a spout and line connector combination with deformable tabs on the spout and threads on the line connector where the tab deformation stabilizes the spout and line connector during threading is provided.

According to another aspect of the present invention, a detent may be incorporated into the connector, and cooperation of the deformable tabs with the line connector threads restrict the decoupling unthreading of the connector and spout.

According to another aspect of the present invention, the tabs deform within the threads, thus resisting decoupling by increasing the torque required to decouple the connector and spout.

According to another aspect of the present invention, the tabs may flex within the threads, thus resisting decoupling by increasing the friction between tab and thread.

Other features and advantages of the invention will be apparent from the following specification taken in conjunction with the following drawings. For purposes of clarity, this discussion refers to devices, methods, and concepts in terms of specific examples. However, the present invention may operate with a wide variety of types of devices that are axially connected. Other industries and applications likewise require a convenient means for connecting and disconnecting a connector with a spout, which may have a valve therein. In view of the disclosure of this application it will be obvious to one skilled in the art that many different embodiments can be devised to achieve the advantages of this invention. Furthermore the invention is described in terms of systems that include many different innovative components and innovative combinations of components. No inference should be taken to limit the invention to combinations containing all of the innovative components listed in any illustrative embodiment in this specification.

BRIEF DESCRIPTION OF THE DRAWINGS

To understand the present invention, it will now be described by way of example, with reference to the accompanying drawings in which.

DETAILED DESCRIPTION OF SPECIFIC EMBODIMENTS

Figure 1:
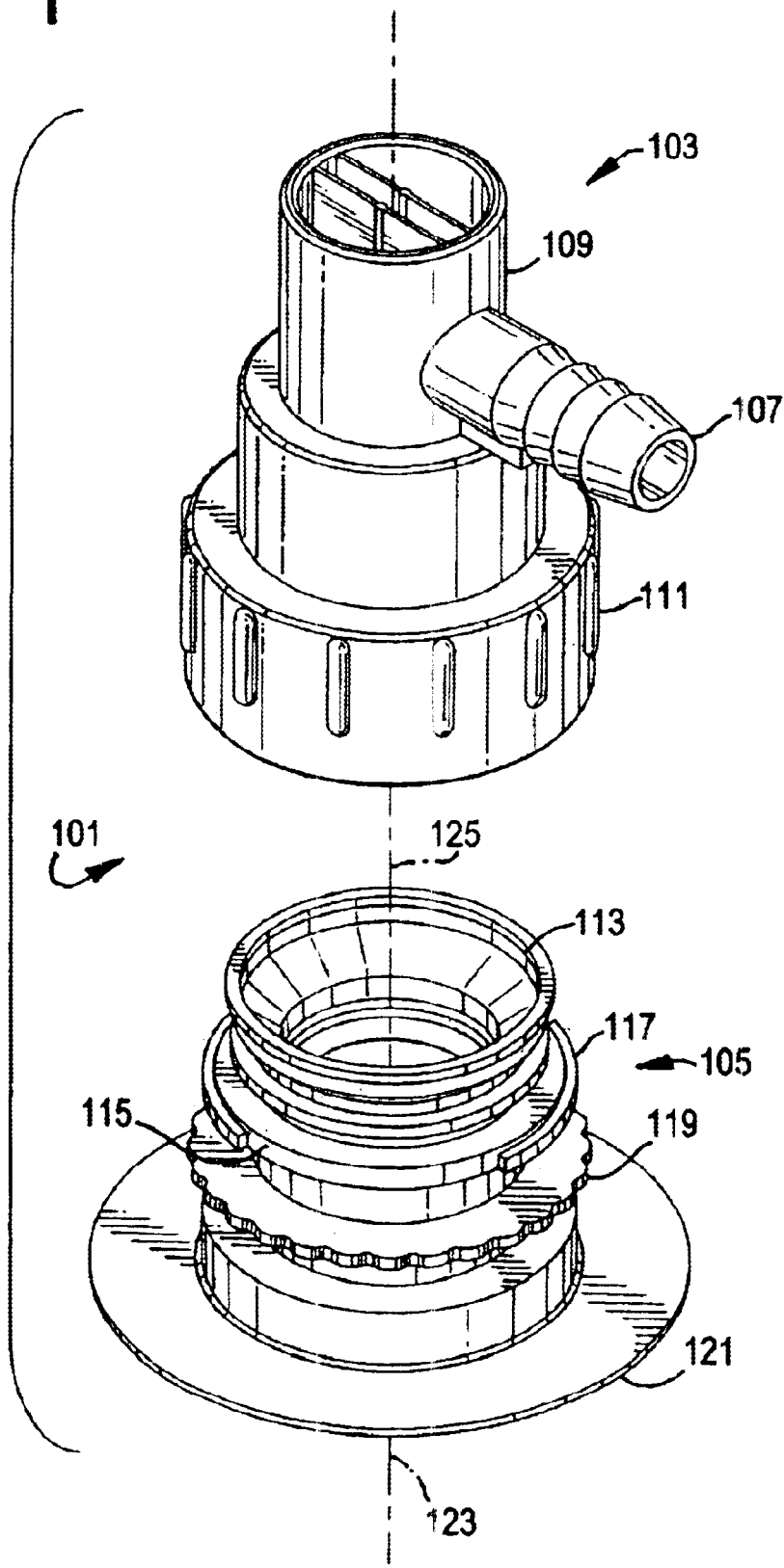
FIG. 1 is a perspective view of an embodiment of the present invention.

While this invention is susceptible of embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated. Further, in order to facilitate the description of the present invention, the following discussion will describe the invention in terms of line connectors used in the beverage industry. It will be understood to those of skill in the art, however, that the invention also may be used as a connector between other components that are axially connected and in equipment used to transport a wide variety of liquids or gases. In addition, the advantages of the connector can be achieved with embodiments that are not specifically disclosed but would be obvious to one skilled in the art in light of this disclosure.

Overview of the Invention

Figure 2:
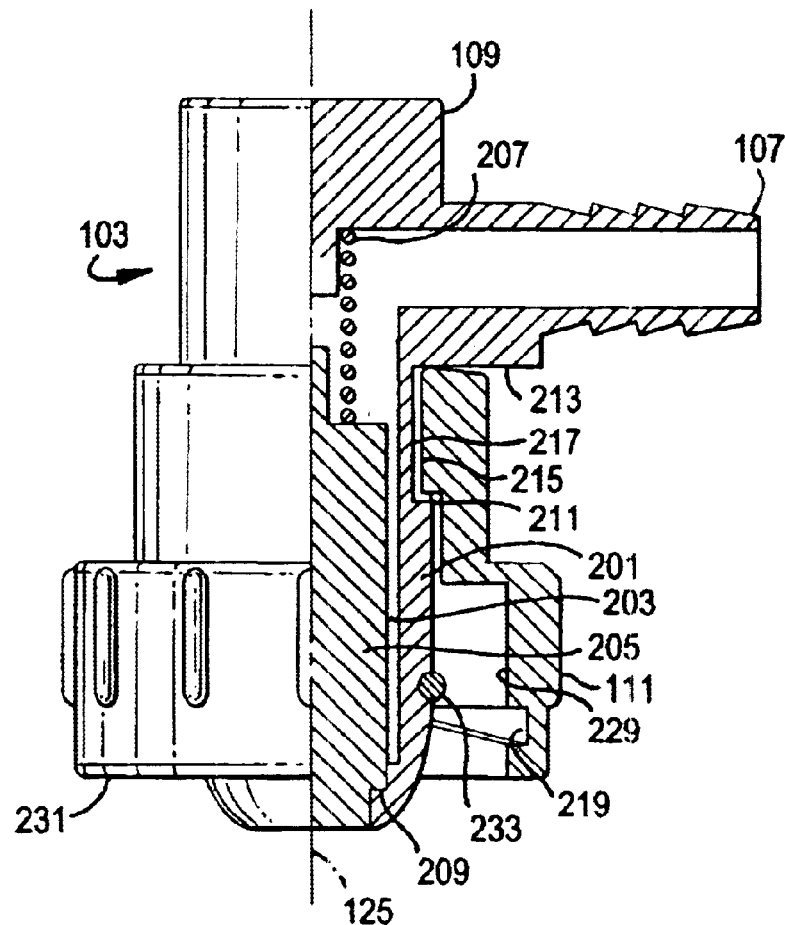
FIG. 2 is a combined side view (left side) and cross-sectional side view (right side) of an uncoupled connector embodiment of the present invention.
Figure 2:
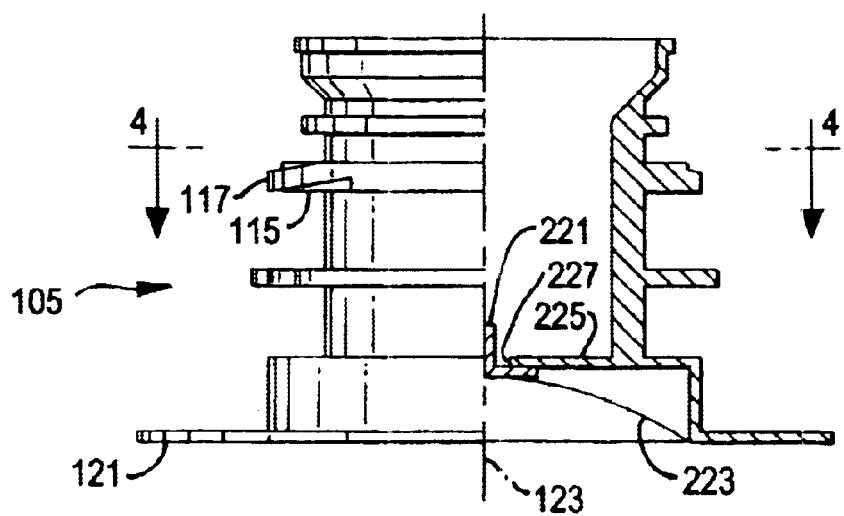
Figure 3:
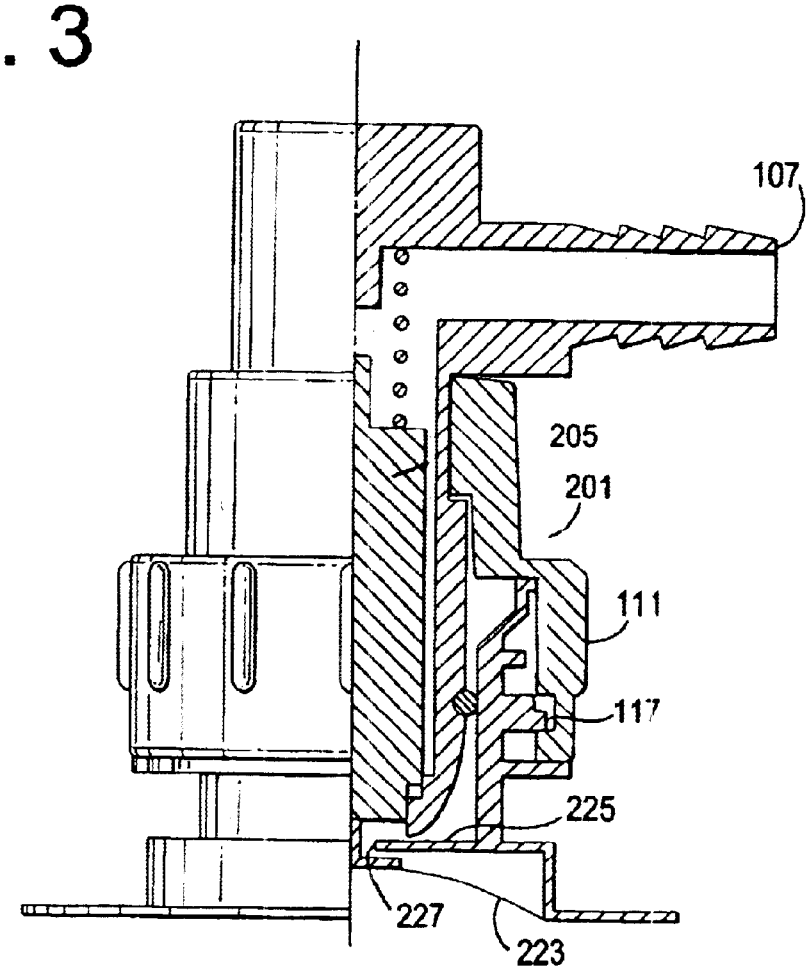
FIG. 3 is a combined side view (left side) and cross-sectional side view (right side) of a coupled line connector and spout of the present invention.

An embodiment of a connector assembly 101 of present invention is shown uncoupled in the perspective view of FIG. 1 and in the side view of FIG. 2, and coupled in the side view of FIG. 3. Connector assembly 101 is comprised of a line connector 103 and a spout 105. As configured for a bag-in-box system, line connector 103 is attached to a hose or tube (not shown) at a fluid line adapter 107, and spout 105 is attached to a bag (not shown) at a bag flange 121. The fluid line adapter can be either a barbed adapter as shown in the embodiment of FIGS. 1 to 3, or may be another adapter known in the art for connecting lines such as Swagelock™, Hansen™ or any other appropriate adapter type. The bag is sealed to bag flange 121, usually using the technique of heat sealing. As described subsequently, line connector 103 and spout 105 are adapted to allow coupling of the line and bag to allow fluid to flow between them by threading a tab 115 located on the spout to a thread 219 internal to the line connector. It is understood that in conjunction with this invention, the term "fully coupled" implies that the coupled connection: (1) does not leak fluid; and, (2) allows for an appreciable flow of fluid through it. Thus a connector is considered fully coupled if it does not leak and the valve does not close.

Line Connector

In addition to fluid line adapter 107, line connector 103 comprises has an internal valve subassembly 109 and a collar nut 111. Valve subassembly 109 has a valve body 201 with an internal cavity 203 that is open to the interior of fluid line connector 107, and has a valve stem 205 inside the cavity. Also inside the cavity is a valve or biasing spring 207 which is preloaded to exert an axial force on stem 205, forcing it against sealing area 209. Valve stem 205 can thus translate axially within cavity 203 from a normally closed position, as shown in FIG. 2, to an open position, against the force of spring 207, as shown in FIG. 3. Collar nut 111 is rotatably disposed about valve body 201, and includes nut flange 215 which axially locates the collar to the valve body by engagement with recess 217. Recess 217 is formed by a nut locating shoulder 211 and a nut restraining surface 213 that may be attached to fluid line adapter 107. An inner surface 229 of collar nut 111 is preferably provided, starting at a tab receiving end 231, with threads 219 that are adapted to facilitate connecting the valve body to the spout 105. Nut 111 and valve body 201 are oriented to allow coupling of assembly 101, preferably by each having a coincident valve body and nut axis 125.

Figure 6:
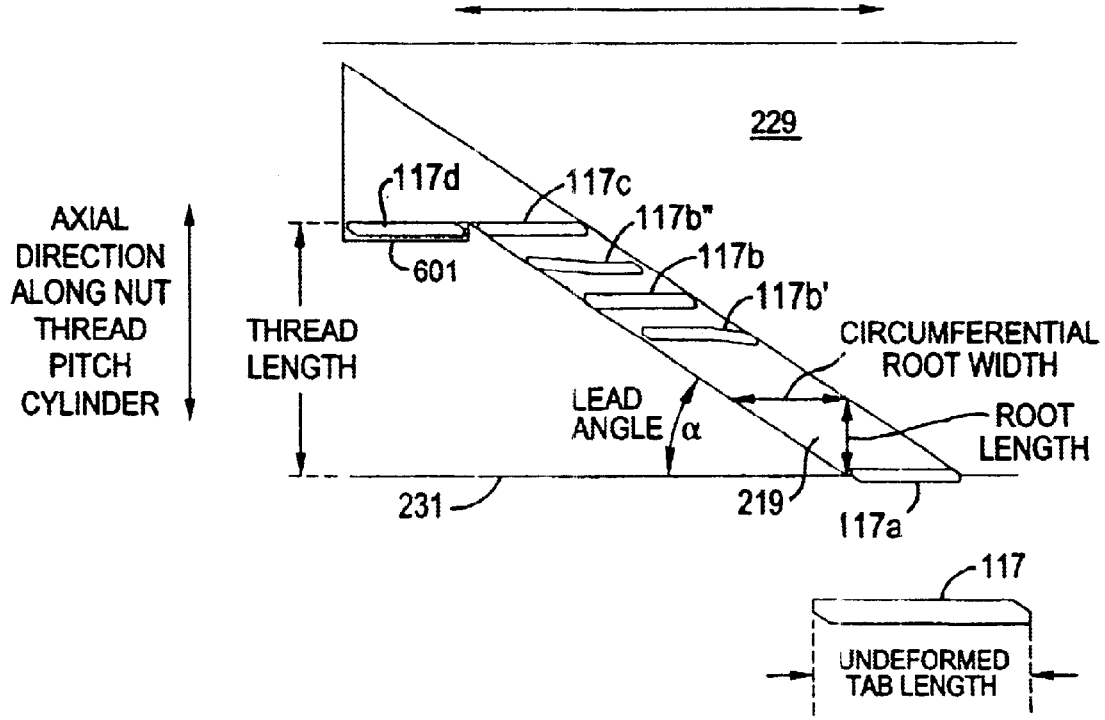
FIG. 6 is a thread form view of one embodiment of the connector threads of the present invention, including the position and shape of the tabs at various stages of threading of the present invention (note that the axial and circumferential dimensions are shown out of proportion to more clearly show the lead angle and the deformation of the tabs); and, FIG. 7 is a thread form view of another embodiment of the connector threads of the present invention, including the position and shape of the tabs at various stages of threading of the present invention (note that the axial and circumferential dimensions are shown out of proportion to more clearly show the lead angle and the deformation of the tabs).
Figure 7:
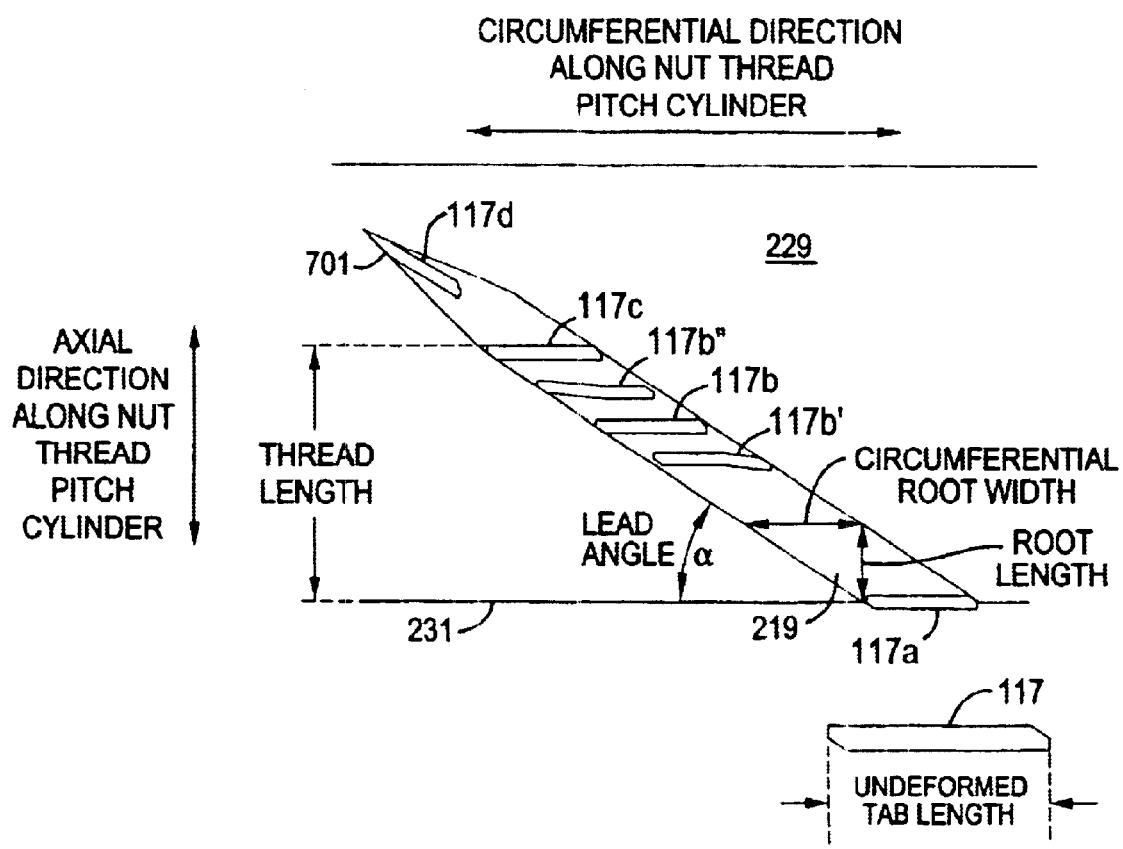

An internal view of nut 111 is shown for two embodiments of this invention in FIGS. 6 and 7. Those figures show, respectively, a first and second embodiment of a thread plan as an unfolded plan view of nut inner surface 229 showing one of threads 219. The advantages of this invention can be achieved with one or more threads, with two preferable for quick-connect operation. The first and second embodiments incorporate square threads of constant lead angle, α. Although square threads are shown, it will be appreciated by those skilled in the art that thread geometries configured to be compatible with other components of this invention can cooperatively work to achieve the advantages of this invention, including but not limited to other thread forms and threads of other pitches or of variable pitch.

FIGS. 6 and 7 show the cylindrical inner surface 229 is presented in a planar view, with one axis in the axial direction along nut axis 111 and the other in a circumferential direction along the nut thread pitch cylinder. The line that bounds thread 219 is the root, or recessed area, of the thread. Since the threads of this particular embodiment are square, the line representing thread 219 as seen in FIGS. 6 and 7 is also an edge view of the thread surfaces that contact the tabs or other threadably engaged members. Also shown are the tab 117 at various stages of threading. The tabs or other members to be threadably engaged with nut 111 contact the nut along the nut as shown as the outline of the root of the threads 219. Some of the thread dimensions are shown in FIGS. 6 and 7 include lead angle, α, the root opening in the circumferential direction ("circumferential root width"), and the root opening along the pitch axis ("root length").

For quick-connect operation thread 219 comprises a pair of square threads with an exemplary constant lead angle α in the range of about 2 to about 15 degrees, with the threads starting at tab receiving surface 231. To provide coupling with a minimum of motion, the layout of thread 219 should be such that nut 111 is fully engaged in three-quarters of a turn or less. Note that in order to better shown the operation of the invention, the axial and circumferential dimensions in FIGS. 6 and 7 are not to scale, with the axial dimension exaggerated relative to the circumferential dimension, and thus the angles in FIGS. 6 and 7 is shown as larger than the exemplary angles.

One difference between the various embodiments is the interaction of the thread and tabs when the connector is nearly fully coupled. The first and second embodiments of FIGS. 6 and 7 differ with respect to the interaction of the threads and tabs when the tabs are fully engaged at the tab restraining portions of the thread. In the first embodiment of FIG. 6 thread 219 opposite tab receiving surface 231 has as a tab restraining portion that is a detent end 601. The second embodiment of FIG. 7 has a the tab restraining portion of the thread that includes a tapered thread 701 formed by a decrease in the thread root dimensions. In a third embodiment (not shown) the threads are of uniform pitch and form, with the tab restraining portion including an end to the thread, thus forming a positive stopping location for the tabs when the connector is fully coupled. Details of the operation of tabs in this invention is discussed subsequently.

Spout

Spout 105 has a spout opening 113 at the spout end opposite bag flange 121 to provide a exit for fluid contained in the bag. The external surface of the spout also has a tab flange 115 extending radially outwards from spout 105. On the most radially outwards surface of tab flange 115 are at least one, and preferably two or more, tabs 117 that likewise extend radially outwards from both spout 105 and the tab flange. The present invention incorporates the advantages of a screw-on self-locking assembly in a connector that is compatible with existing bag-in-box connectors. Prior art spout threads include either: (1) a full male one start threads requiring one or more turns, and thus requiring considerable vertical space, or (2) incorporate pitched partial threads, forcing an increased vertical height. The present invention reduces vertical height requirement, maintaining compatibility with existing connectors, and also minimizes the spout height, leading to easier box loading and removal of the spout by the end user.

Figure 4:
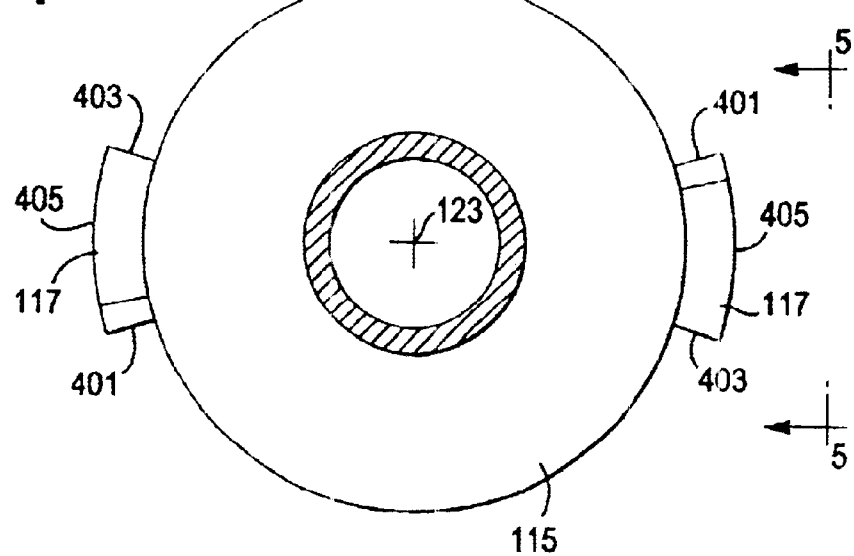
FIG. 4 is a sectional top view about lines 4—4 from FIG. 3, including a configuration of the tabs relative to the spout and tab flange of the present invention.
Figure 5:
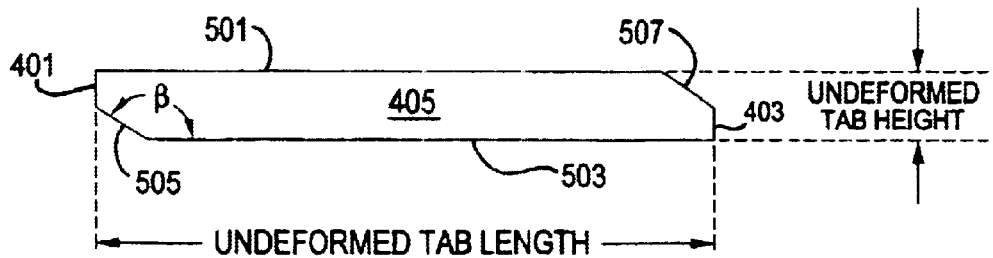
FIG. 5 is a side view about lines 5—5 from FIG. 4, including a tab in one embodiment of the present invention.

The general shape and dimensions of tabs 117 are most easily considered in relation to a spout axis 123. As seen in the top view of FIG. 4, the tabs have a leading edge 401 that enter threads 219 first upon threading, and a trailing edge 403 that enters threads 219 last upon threading. Both leading edge 401 and trailing edge 403 are approximately perpendicular to flange 115, as shown in FIG. 5. Other tab 117 surfaces are a tab top side 501 and tab bottom side 503, both of which are approximately in the same plane as flange 115, a leading edge bevel 505 and a tab trailing edge bevel 507, and an outer tab surface 405 that is furthermost from the spout axis 123. Leading edge 401 and bottom side 503 have an included angle, $\beta$, as does trailing edge 403 and top side 501. Included angle $\beta$ can be from 5 to 15 degrees. The dimensions of the tabs depend on the amount of interaction with the threads required to achieve the advantages of this invention, and thus will depend on the application, the required torque and force, the strength and resilience of the materials used. For the embodiments presented here each undeformed tab length extends approximately 5% to 20% of the outer tab surface 405, has a thickness of from about 1 mm to about 3 mm, and has a depth sufficient to engage threads 219. In addition, the undeformed tab length may range from 80% to 120% of the circumferential root width depending on the required amount of interaction between tabs and threads.

One key feature of the present invention is the flexing and/or deformation of tabs during threading and in cooperation with the tab restraining portion of the threads. The tabs are adapted to flexibly cooperate with the threaded line connector during threading. Specifically, tab outer surface 405, which is the radially outermost edge, moves in a direction along spout axis 123, and tab leading edge 401 and tab trailing edge 403 move to change the shape of the undeformed tab length, as seen in 117b, 117b', and 117b" of FIGS. 6 and 7. The undeformed tab length may be less than, equal to or greater than the circumferential root width, with the relative dimensions between thread and tab controlling the amount of deformation of the tab during threading. In addition, in some embodiments, tab leading edge is adapted to deformably mate into the threads at the tab restraining portion of the thread, as at tapered thread 701. For a bag-in-box liquid dispensing system, the tabs flex under the axial force applied by an operator which the connector is being coupled, and the tab restraining interaction acts against the force of internal valves and the action of the operator when uncoupling the connector. The operation of this invention during threading and when coupled, and the action of valves internal to the connector are discussed subsequently.

Other flanges may be incorporated onto the flange, including a locating flange 119 positioned to extend radially outwards from spout 105 and axially positioned between tab flange 117 and bag flange 121. In addition, there are many valve configuration that can act to seal the line connector and spout. One such configuration is shown in FIGS. 2 and 3. Internal to and near the bag flange end of spout 105 is a poppet valve 221 for sealing the spout. Poppet valve 221 is adapted to seat against spout sealing surface 225 under the action of poppet valve spring 223. A poppet valve port 227 in spout sealing surface 225 provides opens when poppet valve 221 is opened against the force of spring 223.

Preferred materials are those that provide the strength needed to contain the pressure of the fluid lines, have compatibility with the fluid materials, and be easy and inexpensive to manufacture. For use in bag-in-box packages, polyethylene is typical of preferred materials.

Operation of the Invention

The operation of the present invention will be illustrated by way of a connector for a bag-in-box liquid dispensing system. It will be understood by one skilled in the art that this invention is not limited to use in bag-in-box packages, and that the advantages of this invention can be achieved by implementation in other fluid handling systems. Connector assembly 101 is shown in an uncoupled configuration in FIGS. 1 and 2. The fully coupled assembly 101 is shown in FIG. 3. For illustrative purposes that are not meant to limit the scope of this invention, line connector 103 is assumed to be connected to a fluid-containing line at fluid line adapter 107 and spout 105 is assumed to be connected to a fluid-containing bag at bag flange 121. When uncoupled, line connector 103 and spout 105 are sealed with internal valves. Specifically, valve stem 205 is in a closed position, keeping any fluid contained in cavity 203 or fluid line adapter 107 from escaping from valve subassembly 109, and poppet valve 221 is in a closed position, keeping any fluid contained on the side of the poppet valve opposite spout opening 113 from escaping. In conjunction with this invention it is understood that a connector is considered "fully coupled" as long as an the connection (1) does not leak fluid, and (2) allows for an appreciable flow of fluid through it. Thus a connector is considered fully coupled if it does not leak and the valve does not close.

Connector assembly 101 allows line connector 103 and spout 105 to be coupled, allowing fluid to be transferred from fluid line connector 107 to the end of spout 105 near bag flange 121. Coupling is achieved by aligning valve body axis 125 with spout axis 123, allowing the valve body to be inserted into the spout. In addition to axis alignment, a tab receiving end 231 of collar nut 111 is rotated so that threads 219 are brought in contact with tabs 117. Nut 111 is pushed towards bag flange 125 while threading tab 117. The force necessary for threading includes a force to move valve stem 205 against spring 207 and a force that results in deformation of flexible tab 117. Fluid sealing during coupling is achieved with an o-ring 233 on the outer surface of valve body 205 that contacts the inner surface of spout 105, providing a seal to prevent fluid from leaving connector assembly 101. When valve stem 205 and poppet valve 221 further axially approach each other during coupling, the valve stem and poppet valve come into contact, forcing them against their respective spring elements, and providing an axial force that pushes the line connector and spout away from one another in an axial direction. Prior to full coupling, valve stem 205 and poppet valve 221 both unseat, providing an opening through the connector.

One important feature of this invention is that tab deformation is used to provide stability during threading of the connector. In conventional prior art threading apparatus, the function of the flexible tabs of the present invention are replaced with rigid tabs or threads. During threading, forces that cause the spout and nut axis to become misaligned are resisted by prior art rigid connector components. In the present invention, the undeformed tab height is small, on the order of the height of the tab flange, which is from about 1 mm to 3 mm, and preferably about 1.5 mm. The thin structure of the present invention is limited in the amount of support that the connector components can receive during threading. Deformation of the tabs will result from pushing or pulling on the tabs or by misalignment of the axis. Axial pushing or pulling will result in an reactive axial force. Deformation of the tabs due to misaligning the spout and nut axis during threading results in restorative, stabilizing forces that will tend to realign the axis. In some embodiments it will be advantageous to use tabs that are too large for the thread, and thus the tab will deform during the majority of threading. If less support is required, other embodiments may have tabs that easily fit into the thread, and would have little or no deformation in the absence of an axial force. In either case, misalignment of the spout and nut axis will tend to deform the tabs, producing a force tending to realign the axis. The undeformed tab length may range from 80% to 120% of the circumferential root width depending on the required amount of interaction between tabs and threads. With an undeformed tab length of 80% of the circumferential root length, the tab will travel up the threads and interact primarily when the spout and connector are misaligned or when there is an axial force. With an undeformed tab length of 120%, the tab will deform during most of the threading, providing support and stability to the assembly.

Other important features of this invention include the quick connect/disconnect action accomplished by having a lead angle α and thread length chosen so that nut 111 filly engages tabs 117 in three-quarters of a turn or less of the nut, and the placing of tabs 117 along the outer edges of tab flange 115. The quick connect/disconnect action allows assembly 101 to be coupled with a minimal amount of motion, while placing flexible tabs 117 on a flange 115 allows the spout to be used with other, possibly prior art, line connectors that require only a flange for coupling.

Yet another important feature of this invention is the self-locking feature that results from the interaction and cooperation of tabs and threads in the fully coupled connector. In some embodiments the axial force interacts with thread and tab to form a detent or to deform the tabs to provide a self-locking action. In other embodiments the tabs deform into the threads, providing a resistance to uncoupling. The amount of force required to achieve the advantages of this invention will necessarily depend on the materials, application, and force available to the operator. For application in a bag-in-box liquid delivery system, it is preferred that the torque applied to nut 111 or any other portion of connector assembly 101 for operation of the present invention be less than approximately 10 lbf-in. At the start of threading, the interaction between threads and tab should be minimal, preferably less than 0.5 lbf-in, and possibly even 0 lbf-in. As threading proceeds the tabs deform and the torque increases to about 10 lbf-in, preferably not greater than about 7 lbf-in. The torque to unlock the connector from the spout is in the range of from 5 lbf-in to about 10 lbf-in, and is preferably not less than about 7 lbf-in.

The operation of the invention will now be discussed in detail for three embodiments. It is understood that the examples and embodiments described herein are for illustrative purposes only and that various modifications or changes in light thereof will be suggested to persons skilled in the art and are to be included within the spirit and purview of this application and scope of the appended claims.

The progress of tab 117 during threading is shown in FIG. 6 for a first embodiment and FIG. 7 for a second embodiment. In both cases the undeformed tab height is much smaller than the undeformed tab width, as seen in FIG. 5, and the tab width is nearly equal to the circumferential root width, as shown in FIG. 6. For example, the tab width can be from about 5 mm to about 25 mm, while the tab height is from about 1 mm to about 3 mm. This arrangement is for illustrative purposes and is not meant to limit the scope of this invention. By choosing the width of tab 117, the amount of contact with thread 219 can be controlled. The width of tab 117 as shown in these particular embodiments is assumed to be small enough so that the tab can progress along thread 219 without contact, and will deform due to forces that cause misalignment. In absence of axial forces, tab 117 would thus fit within thread 219 without deformation. Tab 117a represents the first contact of the tab with nut 111. The included angle β (see FIG. 5) is chosen relative to lead angle α, such that the tab can easily catch the beginning of thread 219 and will not bind during threading. As nut 111 is rotated, tab 117 travel up the open area of thread 219, from tab 117b midway up to tab 117c at the end of the thread. When nut 111 is fully engaged, tab 117d is locked into the thread at a tab restraining portion which is a detent 601 in the first embodiment and a tapered thread 701 in the second embodiment, and the operator will feel a positive indication that the tabs are filly threaded. For a more positive indication, the detent can be shaped to provide a slight click when engaged. Any fluid that is in the line attached to fluid line adapter 107 in the bag attached to bag flange 121 can now pass through the connector.

The deformation of tab 117b is shown in both FIGS. 5 and 6. As noted previously, deformation may occur because of a displacement with or without spout axis 123 and nut axis 125 aligned. As shown in FIGS. 1–3, the embodiments have two tabs, although more may be used. With two tabs, the force resulting from deformation is imparted in two places on thread 219 which are 180 degrees apart. When nut 111 is being forced onto spout 105, or if the axis are being displaced towards tab 117b, deformed tab 117b' results. The trailing edge of tab 117b' preferentially contacts the trailing edge of thread 219, resulting in a force away from the opening of nut 111. When nut 111 is being pulled away from spout 105, or if the axis are being displaced away from tab 117b, deformed tab 117b" results. The heading edge of the tab 117b" contacts the leading edge of thread 219, pushing the nut 111 onto spout 105. Both of these forces, alone or in concert with the forces of other tabs, stabilizes connector 101 during threading.

The amount of deformation and the resulting forces that the tab undergoes while threading depends on the undeformed tab height and length, the circumferential root width, the root length, and the bevel and lead angles. These factors, along with the choice of materials, governs the forces that the tab imparts to the thread as a result of deformation during threading, and the effect of axial forces on tab deformation. Alternative embodiments include a longer tab that must undergo deformation for threading, thereby increasing the interaction between thread and tab, and hence the restoring force, and increasing or decreasing the rigidity of the tab material to increase or decrease the restoring force.

In the coupled configuration, tab 117d is forced into a position that results in a self-locking action. When coupled, the contact between valve stem 205 and poppet valve 221 cause both of the valves to open, while the force of springs 207 and 223 produce an axial force that mutually repels line connector 103 and spout 105. Thus tab 117d, which is the tab in the coupled configuration, undergoes a force pushing the tab towards the tab receiving end 231. To remained filly coupled, the self-locking action resists spring 207 and 223 forces, as well as any externally applied force. In the first embodiment of FIG. 6, the leading edge of thread 219 has a notch that acts as detent 601. The fully threaded tab 117d drops into detent 601 and is held in place by the axial force of the coupled valves, and deformation of tab 117d is not necessary in this embodiment to restrain the tab in the fully threaded position. In an alternative embodiment, tab 117 may be configured to be self-locking within the detent without the force of the springs. In either case, unthreading is accomplished either by pushing nut 111 towards spout 105 followed by an unthreading twist, or by twisting hard enough to cause tab 117d to deform and jump over detent 601.

In the second embodiment of FIG. 7, there is a change in the shape of thread 219 as it tapers to tapered thread 701. Tapering is accomplished by narrowing the dimensions of the root space within which the tab moves during engagement. For the square threads of FIG. 7, the circumferential root width, the root length, or some combination of these dimensions decrease over the last fractional turn before nut 111 is tightened. As a result of threading tabs 117 into this tapered or confined space, a positive, self-locking stop is provided by tightening nut 111 with enough force to deform and lodge tab 117d into tapered thread 701. Spring forces 207 and 223 act to increase the friction required to uncouple the connector, but are not necessarily required for this embodiment. Tab 117 and thread 219 materials are chosen so that the lodged tab 117d requires a force greater than the axial valve force for unlodging.

In a third embodiment (not shown) the threads are of uniform pitch and form, with the tab restraining portion including an end to the thread, thus forming a positive stopping location for the tabs when the connector is fully coupled. The end of thread for this embodiment includes, for example, a thread that presents a flat surface to the leading tab surface, or any other shaped surface on the threaded body presenting a surface that would be perceived by the operator as indicating that the end of thread had been reached. As line connector 103 and spout 105 are brought together during coupling, the force of springs 223 and 207 increases. The increased force flexes tabs 117 in a manner similar to tab 117b' or 117b" of FIG. 6 or 7, increasing the friction on the threads and the force necessary to couple or uncouple the connector. When filly coupled, the increased friction is sufficient to resist any uncoupling force, either from springs 223 and 207, or from an external source. In an alternative embodiment, tabs 117 may long enough so that they are deformed by the threads, regardless of any forces on the tabs. Thus the tabs will naturally deform and increase the friction with the threads, providing an uncoupling resistive force.

When decoupling the line from the bag, nut 111 is twisted in the direction necessary to unthread the nut with a force sufficient to deform tab 117d so that the thread can proceed towards tab receiving end 231 of the nut. In addition, a slight axial force on nut 111 towards spout 105 will also facilitate unlocking the nut. The spout and line connector will be forced away from each other due to the unthreading motion, the both valves will reseat, the O-ring seal will be broken and the line connector and spout can be decoupled. Only fluid that is between spout sealing surface 225 and O-ring 233 that can escape from connector assembly 101 when the connector is decoupled.

As mentioned previously, for application in a bag-in-box liquid delivery system, it is preferred that the torque applied to nut 111 or any other portion of connector assembly 101 for operation of the present invention be less than approximately 10 lbf-in. At the start of threading, the interaction between threads and tab should be minimal, preferably less than 0.5 lbf-in, and possibly even 0 lbf-in. As threading proceeds the tabs deform and the torque increases to about 10 lbf-in, preferably not greater than about 7 lbf-in. The torque to unlock the connector from the spout is in the range of from 5 lbf-in to about 10 lbf-in, and is preferably not less than about 7 lbf-in.

Alternate Embodiments

In addition, there are other embodiments within the scope if this invention. The invention may be embodied by with axially engaging valves of many different designs. Thus the spout valve could be a slider valve with a probe to actuate the valve stem or could be a poppet valve with a unitary springs valve design, or could not include a valve and consist substantially as a probe to actuate the stem valve.

There are also other thread designs and configurations that would allow the device to perform according to the invention. Some examples are the incorporation of threads that are other than square, that do not have a constant pitch, or that do not have a constant threading area. In addition, the self-locking and stabilizing action of the threads of the present invention can be accomplished by several means, including having threads that have varying undeformed tab height, or that have rounded leading or trailing edges. The secureness of the coupled connector can be adjusted through the spring forces of both the valve springs and the stiffness of the tabs, for example as in raising the torque for coupling and uncoupling by increasing the spring forces.

Conclusion

The invention has now been explained with regard to specific embodiments. Variations on these embodiments and other embodiments may be apparent to those of skill in the art. It is understood that the examples and embodiments described herein are for illustrative purposes only and that various modifications or changes in light thereof will be suggested to persons skilled in the art and are to be included within the spirit and purview of this application and scope of the appended claims. Since the present embodiments are in all respects merely illustrative, and not restrictive, the present invention is not to be limited to the details given herein.

What is claimed:

1. A spout for a container, the spout having a spout axis, a spout surface, and a spout opening, comprising:
   a container mounting flange extending radially outward at an end of the spout opposite the spout opening;
   a flange extending from the spout surface at an axial location between the container mounting flange and the spout opening, the flange being approximately perpendicular to the spout axis and having a flange thickness measured in a direction along the spout axis, the flange also having an outer flange surface distal the spout surface; and,
   at least one flexible tab depending from the outer flange surface, the tab having an undeformed shape having a top side and a bottom side, the top side being the side proximal the spout opening, the tab having a height equal to maximum distance between the top and bottom sides, the tab having a leading edge and a trailing edge, wherein the leading and trailing edges connect the top and bottom sides, the tab having a length, wherein the length is equal to the maximum distance between the leading and trailing edge, and the tab having an outer tab surface distal the outer flange surface, wherein the outer tab surface connects the sides and edges.

2. The spout of claim 1, wherein the outer flange surface is approximately axisymmetric about the spout axis, and wherein the outer tab surface is approximately axisymmetric about the spout axis.

3. The spout of claim 1, wherein the flange thickness is from about 1 mm to about 3 mm.

4. The spout of claim 1, wherein one of the top and bottom sides is approximately perpendicular to the spout axis.

5. The spout of claim 1, wherein the tab has a width equal to the maximum distance between the outer tab surface and the spout surface measured along a radial line from the spout axis, and, wherein the tab width is from about 5 mm to about 25 mm.

6. The spout of claim 1, wherein the tab thickness is from about 1 mm to about 3 mm.

7. The spout of claim 1, wherein the tab height is from about 1 mm to about 3 mm.

8. The spout of claim 1, wherein the leading edge and bottom side have an included angle of from about 5 to about 15 degrees.

9. The spout of claim 1, wherein the tab length as measured along the outer flange surface is from about 5% to about 20% of a circumference of the outer flange surface.

10. The spout of claim 1, wherein the flange and tab are plastic.

11. The spout of claim 10, wherein the plastic is a polyethylene plastic.

12. The spout of claim 1, further comprising two flexible tabs.

13. The spout of claim 12, wherein the two flexible tabs are approximately spaced 180 degrees apart.

14. A spout attached to a flexible bag, the spout comprising:
   a generally cylindrical body, the body having an outer surface having a distal end and a proximal end, and a spout opening adjacent the distal end, the body further having a spout axis, wherein a flexible tab depends from the body, the flexible tab having a shape extending radially from the body and the flexible tab having an undeformed shape having a top side and a bottom side, the top side being the side proximal the spout opening, wherein one of the top side and the bottom side is substantially perpendicular to the spout axis, and wherein the tab has an outer tab surface distal the spout body, and a length of the outer tab surface about a perimeter of the outer tab surface is substantially less than the circumference of the spout body; and
   a bag flange extending radially outward at the proximal end of the spout and attached to the flexible bag.

15. The spout of claim 14, wherein a portion of the top side is substantially parallel to the bottom side.

16. The spout of claim 14, wherein the tab has an outer tab surface that is substantially concentric with the cylindrical body.

17. The spout of claim 14, wherein the tab has an outer tab surface that is substantially axisymmetric about the spout axis.

18. The spout of claim 14, wherein the tab extends from a flange depending from the spout body.

19. The spout of claim 18, wherein the flange has an outer flange surface, and wherein the tab has an outer tab surface having a tab length as measured along the perimeter of the outer tab surface, the tab length being from about 5% to about 20% of a circumference of the outer flange surface.

20. The spout of claim 18, further comprising a second flexible tab depending radially from the flange, the second flexible tab having an undeformed shape having a top side and a bottom side, the top side being the side proximal the spout opening, wherein the top side and the bottom side are substantially perpendicular to the spout axis, and wherein the second flexible tab has an outer tab surface distal the spout body, and a length of the outer tab surface about a perimeter of the outer tab surface is substantially less than the circumference of the spout body.

21. The spout of claim 18, further comprising a second flexible tab depending from the flange, wherein the flange has an outer flange surface, and wherein the tab and the second tab each have an outer tab surface having a tab length as measured along the perimeter of the outer tab surface, the tab length of each of the tab and the second tab being from about 5% to about 20% of a circumference of the outer flange surface, respectively.

22. The spout of claim 14, wherein the tab has a height equal to maximum distance between the top and bottom sides, the height being from about 1 mm to about 3 mm, wherein the tab has a leading edge and a trailing edge, the leading and trailing edges connect the top and bottom sides, wherein the tab has a length, the length being equal to the maximum distance between the leading and trailing edge, and wherein the tab has an outer tab surface distal the spout body, the outer tab surface connecting the sides and edges.

23. The spout of claim 14, further comprising a second flexible tab depending from the body, the second flexible tab extending radially from the body and having an undeformed shape having a top side and a bottom side, the top side being the side proximal the spout opening, wherein the top side and the bottom side are substantially perpendicular to the spout axis, and wherein the second flexible tab has an outer tab surface distal the spout body, and a length of the outer tab surface about a perimeter of the outer tab surface is substantially less than the circumference of the spout body.

24. The spout of claim 23, wherein the second flexible tab and the flexible tab are in substantially the same plane.

25. The spout of claim 23, wherein the second flexible tab has an outer tab surface that is substantially concentric with the cylindrical body.

26. The spout of claim 23, wherein a centerline of the tab and the second flexible tab are approximately 180 degrees apart.

27. The spout of claim 14, wherein the flexible flange is flexible in a generally axial direction.

28. A spout for a flexible bag, the spout comprising:
a generally cylindrical body, the body having an outer surface having a distal end and a proximal end, and a spout opening adjacent the distal end, the body further having a spout axis, wherein a flange extends substantially radially from the outer surface of the body about a circumference of the body, wherein first and second flexible tabs depend from a portion of the flange, the first and second flexible tabs extending radially distal the flange, and wherein the first and second flexible tabs have an undeformed shape having a top side and a bottom side, the top sides being the side proximal the spout opening, and a majority of the top side of the first and second tabs being substantially perpendicular to the spout axis in the undeformed shape; and
a bag flange extending radially outward at the proximal end of the spout and adapted to be attached to the flexible bag.

29. The spout of claim 28, wherein the top side and the bottom side of the first and second tabs, respectively, are substantially parallel.

30. The spout of claim 28, wherein the first and second flexible tabs are spaced about the flange at approximately a 180 degree interval.

31. The spout of claim 28, wherein the first and second tabs have an outer tab surface, the outer tab surface being approximately axisymmetric about the spout axis.

32. The spout of claim 28, wherein the first and second tabs have a tab thickness, the tab thickness being from about 1 mm to about 3 mm.

33. The spout of claim 32, wherein the flange has a flange thickness, the flange thickness being substantially equal to the tab thickness.

34. The spout of claim 28, wherein the first and second tabs have an included angle adjacent a leading edge and bottom side thereof.

35. The spout of claim 28, wherein the first and second tabs have a tab length, and wherein the tab length of each of the first and second tabs is from about 5% to about 20% of a circumference of an outer surface of the flange surface.

36. A spout for a flexible bag adapted to hold a liquid, the spout adapted for coupling with a connector having a rotatable spout adapter, the adapter having an opening to receive the spout, the opening having an internal thread, the spout comprising:
(a) a substantially cylindrical body having an outer surface, a spout opening, and a spout axis;
(b) a flexible first tab, the first tab attached to and protruding radially distal from the outer surface of the cylindrical body about a portion of the circumference of the cylindrical body, the first tab adapted for threadably engaging the internal thread of the spout adapter, wherein the first tab has a top side and a leading edge for engaging the thread, and a bottom side opposing the top side, the top side being substantially perpendicular to the spout axis, wherein the first tab has an undeformed tab length, and wherein the flexible first tab is adapted to deform during threading of the flexible first tab in the internal thread; and
(c) a flexible bag mounting flange extending radially outward at an end of the spot opposite the spout opening.

37. The spout of claim 36, further comprising a flange extending from the body, the flange having a circumference, wherein the first tab depends from the flange, and wherein the undeformed tab length is about 5% to about 20% of the circumference of the flange.

38. The spout of claim 36, further comprising a flange extending from the body, the first tab depending from the flange, wherein a thickness of the flange is approximately equal to a thickness of the first tab.

39. The spout of claim 38, further comprising a second flexible tab extending from the body, the second tab depending from the flange, wherein a thickness of the second tab is approximately equal to a thickness of the flange.

40. The spout of claim 36, wherein the first tab and the second tab are spaced at an interval of approximately 180 degrees.

41. The spout of claim 40, wherein the first tab and the second tab are in substantially the same plane.

42. The spout of claim 36, further comprising a flexible second tab attached to and protruding radially distal from the outer surface of the cylindrical body about a portion of the circumference of the cylindrical body, the second tab adapted for threadably engaging the internal thread of the spout adapter, wherein the second tab has a top side and a leading edge for engaging the thread, and a bottom side opposing the top side, the top side being substantially perpendicular to the spout axis, wherein the flexible second tab has an undeformed tab length, and wherein the flexible second tab is adapted to deform during threading of the flexible second tab in the internal thread.

43. A spout depending from a container, the spout having a spout axis, a spout surface, and a spout opening, comprising:
a container mounting flange extending radially outward at an end of the spout opposite the spout opening;
a flange extending in a plane from the spout surface at an axial location between the container mounting flange and the spout opening, the flange being approximately perpendicular to the spout axis and having a flange thickness measured in a direction along the spout axis, the flange also having an outer flange surface distal the spout surface; and,
at least one flexible tab radially depending from the flange, the tab being in the same plane as the flange.

44. The spout of claim 43, wherein the outer flange surface is approximately axisymmetric about the spout axis, and wherein the tab has an outer tab surface that is approximately axisymmetric about the spout axis.

45. The spout of claim 43, wherein the tab has a top side and a bottom side, and wherein one of the top and bottom sides is approximately perpendicular to the spout axis.

46. The spout of claim 43, wherein the tab has a tab length, and wherein the tab length is from about 5% to about 20% of a circumference of the outer flange surface.

47. The spout of claim 43, further comprising a second flexible tab depending from the flange, the second tab being in the same plane as the flange.

48. The spout of claim 43, wherein the flexible flange is flexible in a generally axial direction.

* * * * *